United States Patent [19]

Kuo et al.

[11] Patent Number: 5,399,540
[45] Date of Patent: Mar. 21, 1995

[54] ZR/V MULTI-SITE OLEFIN POLYMERIZATION CATALYST

[75] Inventors: Chi-I Kuo, Humble, Tex.; Michael W. Lynch, West Chester, Ohio

[73] Assignee: Quantum Chemical Corporation, Cincinnati, Ohio

[21] Appl. No.: 17,120

[22] Filed: Feb. 12, 1993

[51] Int. Cl.⁶ .............................................. B01J 31/00
[52] U.S. Cl. ............................... 502/113; 502/114; 502/115; 502/132; 502/133; 526/116; 526/121; 526/128
[58] Field of Search ............... 502/113, 114, 115, 132, 502/133

[56] References Cited

U.S. PATENT DOCUMENTS

| | | |
|---|---|---|
| 2,919,265 | 12/1959 | Brooks . |
| 3,029,231 | 4/1962 | van Amerongen . |
| 3,030,350 | 4/1962 | de Jong et al. . |
| 3,051,690 | 8/1962 | Vandenberg . |
| 3,058,963 | 10/1962 | Vandenberg . |
| 3,144,473 | 8/1964 | Boor, Jr. et al. . |
| 3,168,484 | 2/1965 | Engel et al. . |
| 3,218,266 | 11/1965 | Ludlum . |
| 3,231,515 | 1/1966 | Ziegler et al. . |
| 3,240,773 | 3/1966 | Boor, Jr. . |
| 3,260,708 | 7/1966 | Natta et al. . |
| 3,345,351 | 10/1967 | McCall et al. . |
| 3,371,079 | 2/1968 | Peters et al. . |
| 3,392,162 | 7/1968 | Ziegler et al. . |
| 3,394,118 | 7/1968 | Boor, Jr. . |
| 3,457,244 | 7/1969 | Fukuda et al. . |
| 3,535,269 | 10/1970 | Tanaka et al. . |
| 3,655,583 | 4/1972 | Yamamoto et al. . |
| 3,786,032 | 1/1974 | Jennings et al. . |
| 3,899,477 | 8/1975 | Altemore et al. . |
| 4,008,358 | 2/1977 | Abe et al. . |
| 4,063,009 | 12/1977 | Ziegler et al. . |
| 4,109,071 | 8/1978 | Berger et al. . |
| 4,154,701 | 5/1979 | Melquist .................. 502/113 |
| 4,192,772 | 3/1980 | Berger et al. . |
| 4,202,958 | 5/1980 | Yamaguchi et al. . |
| 4,256,865 | 3/1981 | Hyde et al. . |
| 4,381,253 | 4/1983 | Shipley . |
| 4,383,119 | 5/1983 | Pullukat et al. . |
| 4,397,761 | 8/1983 | McDaniel et al. . |
| 4,426,317 | 1/1984 | Rogers . |
| 4,434,242 | 2/1984 | Roling et al. . |

(List continued on next page.)

FOREIGN PATENT DOCUMENTS

| | | |
|---|---|---|
| 0314165 | 5/1989 | European Pat. Off. . |
| 0324586 | 7/1989 | European Pat. Off. . |
| 785314 | 10/1957 | United Kingdom . |
| 828201 | 2/1960 | United Kingdom . |
| 1175593 | 12/1969 | United Kingdom . |
| 1489410 | 10/1977 | United Kingdom . |
| 1595992 | 8/1981 | United Kingdom . |
| WO89/01497 | 2/1989 | WIPO . |

OTHER PUBLICATIONS

Karol, et al. (1988) "Developments with High-Activity Titanium, Vanadium, and Chromium Catalysts in Ethylene Polymerization" Kaminsky and Sinn (Eds), 141–161.

Smith, et al. (1985) "Bimetallic Halides, Crystal Structure of an Ethylene Polymerization by $VCl_2 \cdot ZnCl_2 \cdot 4THF$" *Inorg. Chem.* 24, 2997–3002.

Karol, et al. (1987) "Ethylene Polymerization with High Activity Titanium, Vanadium and Chromium Catalysts" *Book of Abstracts, 193rd ACS National Meeting*, Denver, Colo., Apr. 5–10, 1987.

*Primary Examiner*—Asok Pal
*Attorney, Agent, or Firm*—William A. Heidrich; Gerald A. Baracka

[57] ABSTRACT

A catalyst useful in the polymerization of olefins, especially ethylene, is disclosed. The catalyst is obtained by admixing a zinc composition, a zirconium composition and a vanadium composition. The catalyst may be combined with a co-catalyst and, optionally, a modifier to yield an olefin polymerization system. The catalyst exhibits extremely high activity, good hydrogen response and produces polymers having broad molecular weight distribution ("MWD") and manifesting bimodal MWD profile.

17 Claims, 1 Drawing Sheet

U.S. PATENT DOCUMENTS

| | | |
|---|---|---|
| 4,435,518 | 3/1984 | Pennington et al. . |
| 4,435,519 | 3/1984 | Veazey et al. . |
| 4,435,520 | 3/1984 | Aylward . |
| 4,508,842 | 4/1985 | Beran et al. . |
| 4,513,095 | 4/1985 | Speca . |
| 4,536,487 | 8/1985 | Speca . |
| 4,559,318 | 12/1985 | Smith et al. . |
| 4,610,974 | 9/1986 | Speca . |
| 4,611,038 | 9/1986 | Brun et al. . |
| 4,663,404 | 5/1987 | Invernizzi et al. . |
| 4,710,552 | 12/1987 | Bachl et al. ............... 502/113 X |
| 4,754,007 | 6/1988 | Pullukat et al. . |
| 4,810,761 | 3/1989 | Zoeckler et al. . |
| 4,812,432 | 3/1989 | Zoeckler et al. ............... 502/112 |
| 4,831,090 | 5/1989 | Bachl et al. ............... 502/113 X |
| 4,866,021 | 9/1989 | Miro et al. . |
| 4,918,038 | 4/1990 | Samuels et al. ............... 502/113 X |
| 5,079,205 | 1/1992 | Canich . |
| 5,143,882 | 9/1992 | Bueschges et al. ............... 502/113 |
| 5,155,079 | 10/1992 | Cribbs et al. ............... 502/113 |

ZR/V MULTI-SITE OLEFIN POLYMERIZATION CATALYST

BACKGROUND OF THE INVENTION

1. Field of the Invention

The instant invention is directed to a catalyst useful in the polymerization of olefins, particularly homopolymerization and copolymerization involving ethylene. Specifically, the instant invention is directed to a catalyst comprised of a zirconium composition, a vanadium composition and an activator. The instant invention is particularly useful in producing an ethylene homopolymer having a broad molecular weight distribution (MWD), a bimodal molecular weight distribution profile, and a unique combination of physical properties, all in a single reactor.

2. Description of the Prior Art

The polymerization of olefins using transition metal catalysts is well established in the art. Polymerizations employing these catalysts produce polyolefins possessing desired characteristics in high yield, usually at processing conditions of low temperature and low pressure, thus making these catalysts the subject of much research. An especially important class of catalysts where improvement is sought is that class of catalysts which produce ethylenic and/or alpha-olefinic polymers, particularly the commercially important polymer, polyethylene.

Of practical interest is the development of a catalyst which will yield polymer adaptable for use in high strength films and light weight blow molding resins. Generally, these characteristics are indicative of a polymer having a broad molecular weight distribution. The usual measure of the dispersity of the molecular weight distribution in the art has been the ratio of the weight average molecular weight to the number average molecular weight. A distribution is said to be narrow if for a given polymer type of constant average molecular weight, the number average molecular weight is substantially the same as the weight average molecular weight. As the ratio of weight average molecular weight to number average molecular weight increases from over 1:1, the distribution becomes broad. Generally, as the distribution becomes broad, film strength and resin processability improve. Thus in applications where these traits are of concern, a broad molecular weight distribution is desirable.

To further modify the physical characteristics and performance properties of a polymer, the shape of the molecular weight distribution curve can be varied. One technique of varying the molecular weight so that it becomes broadened is by making the distribution polymodal, i.e., making the polymer appear as though it consists of two (bimodal) or three (trimodal) distinct polymers. By controlling the location and concentration of the modes, the molecular weight distribution may be varied and different processing and end-use properties may be obtained. To achieve these results special catalyst systems must be used.

To attain these properties, as desired, the common practice heretofore has entailed the use of multiple reactors, such as in a cascade system, and, as necessary, the employment of different catalysts in the reactor sequence so to produce the sought-after polymer characteristics. Because of the complexity and cost of such processing, as correlates for example to the number of reactors required, the necessity of different catalysts etc., the art recognizes a continuing need of producing the aforementioned polymer characteristics without multiple reactors or multiple catalysts.

Though desirable, the art has been unable to develop an entirely satisfactory catalyst able to produce, in a single reactor, a polymer having the requisite properties while at the same time evincing high activity, i.e., leaving low catalyst residue in the product, good hydrogen response (to facilitate control of molecular weight), minimization of low molecular weight tail so as to eliminate odor or smoke problems that often occur in downstream processing, and not requiring a substantial amount of promoter.

SUMMARY OF THE INVENTION

A new catalyst has now been developed which exhibits high activity and produces, in a single reactor, olefin polymers having a broad molecular weight distribution characterized by a bimodal molecular weight distribution profile. The use of a single reactor alleviates gel problems caused by undispersed resin and is cost effective by eliminating the need to redesign current reactors, employ two or more existing reactors in a cascade system, or to construct a new cascade reactor system. The present invention obtains a polymer having a broad molecular weight distribution with a bimodal characteristic by using a catalyst having two types of active centers: one center having, e.g., a low sensitivity to hydrogen as a chain transfer agent resulting in a very low melt index polymer; the other having, e.g., an extremely high sensitivity to hydrogen resulting in a very high melt index polymer. A catalyst having two types of active centers is denoted in this specification as a dual site catalyst.

In accordance with the present invention, a catalyst is provided which comprises the product obtained by admixing a zirconium composition having the formula $ZrX_a^1(OR^1)_{4-a}$ wherein $X^1$ is halogen, $R^1$ is hydrocarbyl having 1 to about 18 carbon atoms and a is 0 or an integer from 1 to 4, or mixtures thereof; and a vanadium composition selected from the group consisting of compounds having the formula $VX_c^2(OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to b, $VOX_d^3(OR^3)_{3-d}$ wherein $X^3$ is halogen, $R^3$ is hydrocarbyl having 1 to about 18 carbon atoms and d is 0 or an integer from 1 to 3, $VOX_2^4$ wherein $X^4$ is halogen, or mixtures thereof; and an activator selected from the group consisting of compounds having the formula $ZnX_2^5 \cdot 2AlR_3^4$ wherein $X^5$ is halogen, $R^4$ is hydrocarbyl having 1 to about 12 carbon atoms, or $MR_e^5X_{3-e}^6$ wherein M is aluminum or boron, $X^6$ is halogen, $R^5$ is hydrocarbyl having 1 to about 12 carbon atoms and e is 0 or an integer from 1 to 3, or $Al_2R_3^6X^7$ wherein $R^6$ is hydrocarbyl having 1 to about 12 carbon atoms and $X^7$ is halogen, or $MgR_f^7Y_{2-f}$ wherein $R^7$ is hydrocarbyl having 1 to about 12 carbon atoms, Y is halogen or has the formula $OR^8$ wherein $R^8$ is hydrocarbyl having 1 to 12 carbon atoms or Y is a silyl amide having the formula $N(SiR_3^9)_2$ wherein $R^9$ is hydrocarbyl having 1 to about 12 carbon atoms and f is 0, 1 or 2, or mixtures thereof.

In further accordance with the present invention, an olefin polymerization process is provided.

In this process, olefins such as ethylene and/or one or more alpha-olefins are contacted with the above-defined catalyst, a co-catalyst and, optionally, a modifier under polymerization conditions effective to obtain a homopolymer or copolymer.

The olefin polymerization catalyst system of the present invention is useful in gas phase, slurry and solution polymerization processes and finds particular utility in producing ethylene homopolymer, or a copolymer of ethylene and one or more alpha-olefins. The polymer thus produced has high molecular weight and a broad molecular weight distribution.

BRIEF DESCRIPTION OF THE DRAWING

The Figure illustrates the bimodal molecular weight distribution typically obtained in slurry homopolymerization of ethylene utilizing the catalyst of the present invention. The catalyst in this particular polymerization was the product obtained by admixing $ZnCl_2 \cdot 2Al(C_2H_5)_3$, $ZrCl_2(OC_4H_9)_2$, and $VO(OC_4H_9)_3$ in a molar ratio of 12:1:5, respectively.

DETAILED DESCRIPTION OF THE INVENTION

Figure 1:
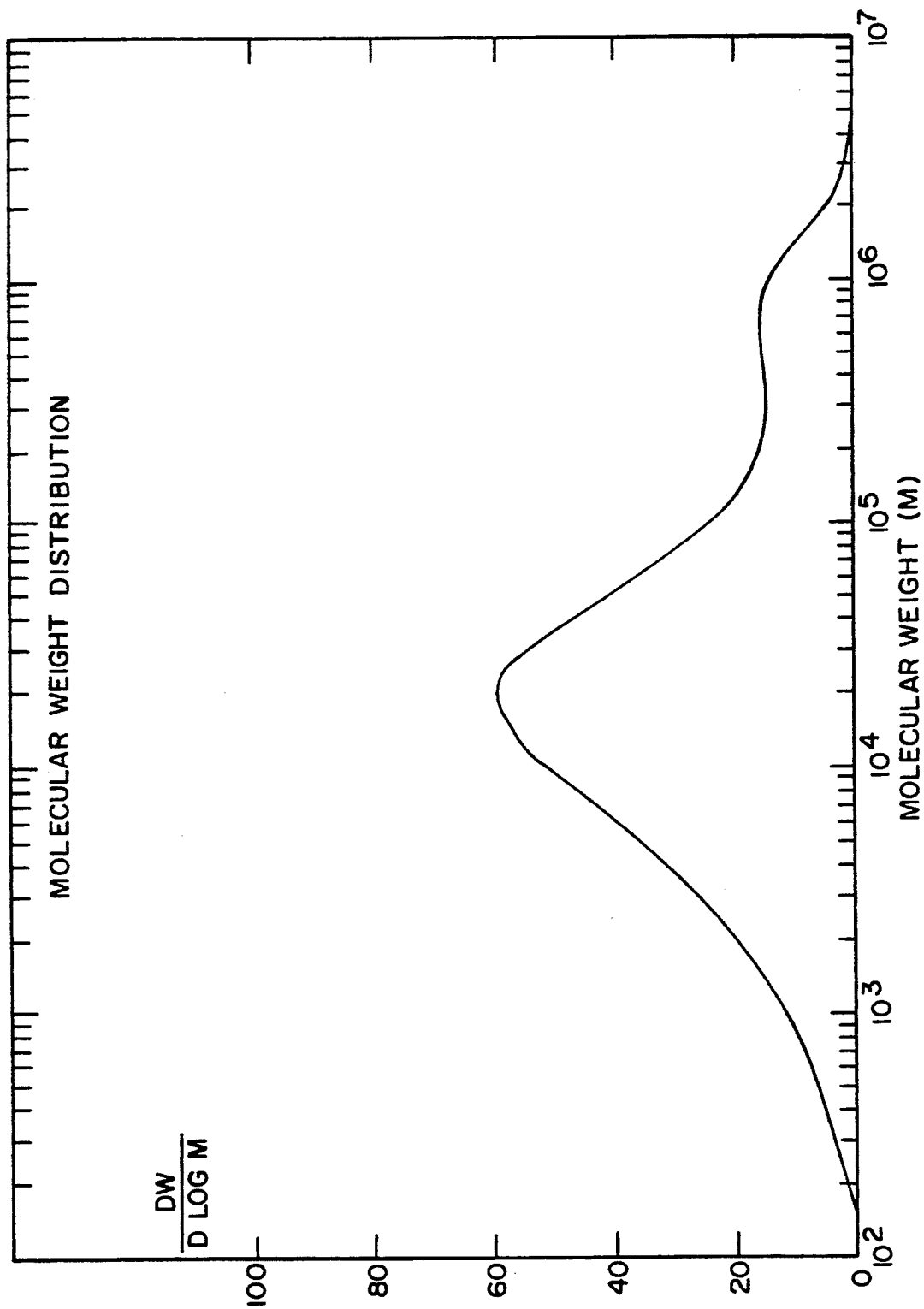

In accordance with the present invention a catalyst is provided. Although not required in the practice of the present invention, a hydrocarbon solvent may be employed as a medium for the preparation of the instant catalyst. Non-polar solvents, e.g., alkanes (such as hexane and heptane), cycloalkanes and aromatics are preferred. If a solvent is employed, it is preferred that the solvent is dried in order to remove water. Drying in this regard may be accomplished by techniques known in the art, e.g., by molecular sieve. The solvent may be allowed to remain throughout preparation of the catalyst and can be removed by conventional means, such as decantation, filtration or evaporation.

The catalyst of the present invention is the product obtained by admixing a zirconium composition, a vanadium composition and an activator, all as defined hereinbelow. It should be appreciated that no particular sequence of admixing is required and that the present invention contemplates simultaneous admixing as well as any combination of sequential admixing.

If other than simultaneous admixing is utilized, no specific time period need elapse between the addition of any one or more of the zirconium composition, vanadium composition and activator. If sequential admixing is employed, it is preferred that about 30 minutes elapse between additions.

Stirring, although not necessary, is also preferred.

The zirconium composition useful in the practice of the present invention has the formula $ZrX_a^1(OR^1)_{4-a}$ wherein $X^1$ is halogen, $R^1$ is hydrocarbyl having 1 to about 18 carbon atoms and a is 0 or an integer from 1 to 4. Preferably, $R^1$ has 2 to about 10 carbon atoms. As a hydrocarbyl, $R^2$ is preferably alkyl, and depending on the number of carbon atoms, cycloalkyl, aryl, aralkyl or alkaryl. $X^1$ is preferably chlorine. Examples of preferred zirconium compositions include $ZrCl_4$, $ZrCl_2(OC_4H_9)_2$, $Zr(OC_3H_7)_4$ and $Zr(OC_4H_9)_4$.

Mixtures of zirconium compositions may also be used in the practice of the present invention.

The vanadium composition useful in the instant invention has the formula $VX_c^2)OR^2)_{b-c}$ wherein $X^2$ is halogen, $R^2$ is hydrocarbyl having 1 to about 18 carbon atoms, b is the valence of vanadium and is 3 or 4 and c is 0 or an integer from 1 to b. Preferably, $R^2$ has 2 to about 6 carbon atoms. As a hydrocarbyl, $R^2$ is preferably alkyl, and depending on the number of carbon atoms, cycloalkyl, aryl, aralkyl or alkaryl. $X^2$ is preferably chlorine. An example of a preferred vanadium compound having this formula is $VCl_4$.

A vanadium composition also useful in the practice of the present invention has the formula $VOX_d^3(OR^3)_{3-d}$ wherein $X^3$ is halogen, $R^3$ is hydrocarbyl having 1 to about 18 carbon atoms and d is 0 or an integer from 1 to 3. Preferably, $R^3$ has 2 to about 6 carbon atoms. As a hydrocarbyl, $R^3$ is preferably alkyl, and depending on the number of carbon atoms, cycloalkyl, aryl, aralkyl or alkaryl. $X^3$ is preferably chlorine. Examples of preferred vanadium compounds having this particular formula include $VOCl_3$, $VO(iOC_3H_7)_3$ and $VO(OC_4H_9)_3$.

Another vanadium composition useful in the present invention has the formula $VOX_2^4$ wherein $X^4$ is halogen; an example of a preferred vanadium compound in this regard is $VOCl_2$.

Mixture of vanadium compositions may also be used in the practice of the instant invention.

An activator useful in the practice of the present invention has the formula $ZnX_2^5 \cdot 2AlR_3^4$ wherein $X^5$ is halogen and $R^4$ is hydrocarbyl having from 1 to about 12 carbon atoms; preferably 2 to 6 carbon atoms. As a hydrocarbyl, $R^4$ is preferably alkyl, and depending on the number of carbon atoms, cycloalkyl, aryl, aralkyl or alkaryl. $X^5$ is preferably chlorine. An example of an activator in this regard is $ZnCl_2 \cdot 2Al(C_2H_5)_3$.

An activator having this formula may be prepared by contacting a zinc halide with an aluminum hydrocarbyl. Preferably, in the practice of this embodiment, about one mole of zinc halide is contacted with about two moles of aluminum hydrocarbyl. Contact in this regard may occur separately, i.e., before admixture with any of the other catalyst-forming components, or it may occur in situ upon the addition of sufficient quantities of zinc halide and aluminum hydrocarbyl to the catalyst admixture. Heating may be required, as necessary, to dissolve the zinc halide. The activator thus formed, in either case, is soluble in non-polar solvents such as heptane. A preferred zinc halide is zinc chloride; a preferred aluminum hydrocarbyl is aluminum alkyl, more preferably triethyl aluminum.

Another activator useful in the practice of the present invention has the formula $MR_e^5X_{3-e}^6$ wherein M is aluminum (Al) or boron (B), $R^5$ is hydrocarbyl having 1 to about 12 carbon atoms, $X^6$ is halogen and e is 0 or an integer from 1 to 3. Preferably, $R^5$ has 2 to about 6 carbon atoms. As a hydrocarbyl, $R^5$ is preferably alkyl, and depending on the number of carbon atoms, cycloalkyl, aryl, aralkyl or alkaryl. $X^6$ is preferably chlorine. Examples of activators having this formula include diethyl aluminum chloride $((C_2H_5)_2AlCl)$, ethyl aluminum dichloride $(C_2H_5AlCl_2)$, ethyl boron dichloride $(C_2H_5BCl_2)$ and boron trichloride $(BCl_3)$.

Still another activator useful in the practice of the present invention has the formula $Al_2R_3^6X_3^7$ wherein $R^6$ is a hydrocarbyl having 1 to about 12 carbon atoms and $X^7$ is halogen. Preferably $R^6$ has 2 to about 6 carbon atoms. As a hydrocarbyl, $R^6$ is preferably alkyl, and depending on the number of carbon atoms present, cycloalkyl, aryl, aralkyl or alkaryl. $X^7$ is preferably chlorine. An example of an activator having this formula is aluminum sesquichloride $((C_2H_5)_3Al_2Cl_3)$.

Yet still another activator useful in the practice of the present invention has the formula $MgR_f^7Y_{2-f}$ wherein $R^7$ is hydrocarbyl having 1 to about 12 carbon atoms, Y is halogen, or has the formula $OR^8$ where $R^8$ is hydrocarbyl having 1 to about 12 carbon atoms, or Y is a silyl amide having the formula $N(SIR_3^9)_2$ where $R^9$ is hydrocarbyl having 1 to about 12 carbon atoms and f is 0, 1 or 2. A description of compounds conforming to this definition of Y is found in U.S. Pat. No. 4,383,119 the contents of which are incorporated herein by reference. Preferably $R^7$, $R^8$ and $R^9$ have 2 to about 6 carbon atoms, respectively. As hydrocarbyls, $R^7$, $R^8$ and $R^9$ are preferably alkyl and depending on the number of respective carbon atoms, cycloalkyl, aryl, aralkyl or alkaryl. The preferred halogen is chlorine. Examples of activators having this formula include dibutyl magnesium (($C_4H_9)_2Mg$), butyl ethyl magnesium ($C_4H_9MgC_2H_5$) and butyl magnesium silyl amide, e.g., $C_4H_9MgN$ $(Si(CH_3)_3)_2$, also known as BMSA.

Mixtures of activators having the aforedescribed formulas may also be used in the practice of the invention.

The amount of zirconium composition, vanadium composition and activator used in the preparation of the catalyst of the subject invention is most conveniently stated as a molar ratio. Thus for about each mole of zirconium composition, up to about 10 moles of vanadium composition and up to about 25 moles of activator may be utilized.

In a preferred practice of the invention, up to about 8 moles of vanadium composition and up to about 17 moles of activator may be utilized for about each mole of zirconium composition. More preferably, for about each mole of zirconium composition, up to about 5 moles of vanadium composition and up to about 12 moles of activator are employed. Still more preferably, for about each mole of zirconium composition, up to about 3 moles of vanadium composition and up to about 8 moles of activator are employed. Yet still more preferably, for about each mole of zirconium composition, up to about 2 moles of vanadium composition and up to about 6 moles of activator are employed. More preferably, for about each mole activator zirconium composition, up to about 1 mole of vanadium composition and up to about 4 moles of activator are employed.

After admixing the zirconium composition, vanadium composition and activator, the catalyst product thus obtained can be recovered. If a solvent has been employed, it is preferable to remove the same; techniques known in the art, e.g., decantation, filtration or evaporation may be used in this regard. If evaporation is employed, it is preferred that a nitrogen purge at a temperature of about 100° C. be utilized.

It should be appreciated that in the preferred practice of the present invention the catalyst is prepared under an inert atmosphere, such as a nitrogen atmosphere. Furthermore, it is desirable that catalyst preparation be conducted under conditions that are substantially free of oxygen. Thus in preferred practice, no more than 100 ppm of oxygen, based on the weight of the gaseous atmosphere, is present during catalyst preparation. More preferably, no more than 10 ppm of oxygen is present; most preferably, no more than 1 ppm of oxygen is present, based on the weight of the gaseous atmosphere.

It is also desirable that catalyst preparation be conducted under conditions that are substantially free of water. Thus in a preferred practice, no more than 5% by weight water, based on the weight of the admixture, is present during catalyst preparation. More preferably, no more than 0.5% by weight water, and most preferably no more than 0.05% by weight water is present, based on the weight of the admixture.

In practicing the present invention, the admixing generally occurs at or about room temperature, e.g., about 20° C. to about 25° C., and at or about atmospheric pressure. Thus no special heating or cooling and no vacuum or pressurization are necessary. However, these may be employed without detriment and in certain embodiments of the present invention, one or the other is preferred.

More specifically, the preparation of certain embodiments of the present invention are facilitated by heating and/or cooling steps. For example, the zirconium compound $Zr(OC_4H_9)_4$ when obtained commercially (e.g. from Dynamite-Nobel Chemical) has a certain amount of butanol ($C_4H_9OH$) associated with it. Similarly, there is residual alcohol present if, as in one embodiment of the present invention, $ZrCl_4$ is reacted with an alcohol, e.g., butanol, to form a zirconium alkoxy and/or a zirconium chloroalkoxy. In these circumstances, it is preferred practice to heat the solution admixture in order to facilitate the interaction of components. Heating in this regard is preferably at a temperature of up to about 100° C., more preferably about 85°–90° C.

Moreover, in certain embodiments it is desirable to cool the admixture prior to the final addition of either the vanadium composition, zirconium composition or activator. Cooling in this regard may be employed when, for example, the final addition is found to be too exothermic for convenient manipulation. Cooling is preferably to temperature at or about 0° C.

While the catalyst product obtained after admixing the catalyst-forming components need not be washed, it is preferred practice to do so, preferably with the solvent in which admixing occurred, if a solvent was used. Preferably, washing is repeated more than once, e.g., three times.

The catalyst product thus obtained need not be dried prior to use, especially if slurry polymerization is contemplated, but may be dried without detriment. If drying is performed, it is preferably done at a temperature of about 100° C. with a nitrogen purge for approximately thirty minutes.

The product obtained by the aforedescribed procedure represents the catalyst of the instant invention, which when combined with a co-catalyst forms an olefin polymerization catalyst system. Co-catalysts useful in the practice of this aspect of the present invention include metal alkyls, metal alkyl hydrides, metal alkyl halides, or metal alkyl alkoxides, the metal being aluminum, boron, zinc, or magnesium and the alkyl having 1 to about 12 carbon atoms, preferably 2 to about 6 carbon atoms; mixtures of co-catalyst may also be employed. Preferred cocatalysts include aluminum trialkyls with triethylaluminum and/or tri-isobutylaluminum especially preferred.

Co-catalyst is generally utilized in an amount that conforms to a molar ratio of co-catalyst to zirconium composition of about 1:1 to about 200:1; a more preferred ratio is about 1:1 to about 50:1. The catalyst and the co-catalyst may be added continuously to the polymerization rector during the course of the polymerization to maintain the desired ratio.

Modifiers, sometimes referred to as "promoters" in the art, are typically chosen for their ability to increase and maintain the reactivity of vanadium catalyst, and also affect melt index and melt index ratio (MIR), which is a measure of molecular weight distribution.

Useful modifiers include halogenating agents such as those of the formula $M^1H_gX_{h-g}^8$ wherein $M^1$ is Si, C, Ge or Sn (preferably Si or C, and most preferably C), $X^8$ is halogen (preferably Cl or Br and most preferably Cl), g is 0, 1, 2 or 3, and h is the valence of $M^1$. Such modifiers are disclosed in Miro, et al. U.S. Pat. No. 4,866,021 (Sep. 12, 1989), the disclosure of which is incorporated herein by reference. Modifiers of this type include chloroform, carbon tetrachloride, methylene chloride, dichlorosilane, trichlorosilane, silicon tetrachloride, and halogenated hydrocarbons containing 1 to 6 carbon atoms such as those available from E. I. duPont de Nemours & Co. under the trade designation Freon (e.g., Freon 11 and Freon 113).

Bachl, et al. U.S. Pat. No. 4,831,090 (May 16, 1989), the disclosure of which is incorporated herein by reference, discloses several classes of organohalogen compounds which are useful as modifiers. These include saturated aliphatic halohydrocarbons, olefinically unsaturated aliphatic halohydrocarbons, acetylenically unsaturated aliphatic halohydrocarbons, aromatic halohydrocarbons, and olefinically unsaturated halogenated carboxylates.

Particularly preferred modifiers are halocarbon compounds of the formula $R_1{}^{10}CS_{4-i}{}^9$ wherein $R^{10}$ is hydrogen or an unsubstituted or halogen substituted saturated hydrocarbon having from 1 to 6 carbon atoms; $X^9$ is halogen and i is 0, 1 or 2. Examples of these halocarbon compounds include fluoro-, chloro-, or bromo-substituted ethane or methane compounds having at least two halogens attached to the carbon atoms. Especially preferred modifiers include $CCl_4$, $CH_2Cl_2$, $CBr_4$, $CH_3CCl_3$, $CF_2ClCCl_3$, with the most especially preferred being $CHCl_3$ (chloroform), $CFCl_3$ (Freon 11) and $CFCl_2CCF_2Cl$ (Freon 113). Mixtures of any of these modifiers may be used.

Selection of modifiers can be used to adjust polymer properties, sometimes at the expense of activity.

Preferred polymer properties may be obtained with a chosen modifier at a ratio of modifier to transition metal which is a compromise to maximum catalyst activity. The product molecular weight distribution and response of melt index to the presence of hydrogen are tunable by choice and concentration of modifier. Activity, melt index ratio (MIR), high load melt index (HLMI), etc. all vary with the ratio of modifier to transition metal, and with the choice of modifier.

The modifier utilized, when it is utilized, is present in an amount that corresponds to a ratio of modifier to vanadium composition of about 0.1:1 to about 1000:1 (mole:mole), preferably about 1:1 to about 100:1, and more preferably about 5:1 to about 50:1.

The polymerization reaction may be conducted under solution, slurry or gas phase (including fluidized bed) conditions, at a temperature of about 50° to about 250° C.; preferred temperature is about 50° to 110° C.; more preferred temperature is about 65° to about 105° C. Pressure is from about ambient to about 30,000 psi; preferred pressure is about ambient to about 1,000 psi; more preferred pressure is about ambient to about 700 psi.

The polymer obtained by the process of the present invention may be a homopolymer of ethylene, a homopolymer of an alpha-olefin, a copolymer of two or more alpha-olefins, or a copolymer of ethylene and one or more alpha-olefins, said alpha-olefins having 3 to about 12 carbon atoms. Alpha-olefins particularly useful in the present invention include propylene, 1-butene, 1-pentene, 1-hexene, 1-octene, 1,3-butadiene and 1,5-hexadiene.

The polymer thus produced can have a melt index (MI) at 190° C. and 2.16 kg (as measured by ASTM D1238-82) as high as up to about 1000, and as low as about 0.01 or less. The melt index ratio (HLMI/MI, also denominated as MIR) of the polymer capable of being produced will vary depending on the above parameters of HLMI and MI; for example, the HLMI/MI may be between about 30:1 to about 400:1, preferably between about 40:1 to about 400:1 and more preferably between about 50:1 to about 400:1. As appreciated by those of skill in the art, the melt index ratio correlates to molecular weight distribution (MWD).

The polymer produced by the catalyst of the present invention does not require polymer de-ashing to be commercially acceptable in low ash polymer applications.

The polymer of the present invention also exhibits a bimodal molecular weight distribution profile, as when examined by gel permeation chromatography with 1,2,4 trichlorobenzene as a solvent.

The following examples are illustrative of the scope of the present invention and are not intended as a limitation thereon.

EXAMPLE 1

Preparation of Activator

Activator was prepared from zinc dichloride ($ZnCl_2$) and triethyl aluminum ($Al(C_2H_5)_3$). The preparation was carried out under an $N_2$ atmosphere. Heptane was used as a solvent.

Zinc dichloride (34.05 grams; the corresponding concentration was about 0.25 moles) was placed into a Fisher-Porter bottle in a dry glove box. A solution of triethyl aluminum (320.5 milliliters, the corresponding concentration was about 0.5 moles), in heptane, was subsequently added; the ratio of zinc to aluminum was 1:2. The solution was heated to 90° C. for 2 hours, with stirring. After the heating, the solid $ZnCl_2$ dissolved to form the activator, which was soluble in the heptane. The activator, $ZnCl_2 \cdot 2Al(C_2H_5)_3$, was used without any further purification.

EXAMPLE 2

Catalyst Preparation

A catalyst composition of $VOCl_3$, $Zr(OC_4H_9)_4 \cdot nC_4H_9OH$, and $ZnCl_2 \cdot 2Al(C_2H_5)_3$ was prepared. The molar ratio of these catalyst components, in the order listed, was about 1:1:4.

Into a three-neck round bottom flask fitted with a paddle stirrer and purged with a $N_2$ was placed heptane (50 mls) and then $VOCl_3$ (10 mls of a 1M solution, the corresponding concentration was about 0.01 moles). $Zr(OC_4H_9)_4 \cdot nC_4H_9OH$ was obtained from Dynamite-Nobel Chemical; n was calculated to be 1.3. This viscous zirconium compound was added (4.35 ml, the corresponding concentration was about 0.01 mole) in dropwise fashion to the $VOCl_3$ solution. The solution turned an orange-yellow color and was opaque. The solution was heated to 85° C. for 30 minutes, with stirring, after which time the solution had turned a light brown and had become clear, and no acid was detected in the $N_2$ gas purge effluent. The solution was then chilled to 0° C.

To the chilled solution was slowly added $ZnCl_2 \cdot 2Al(C_2H_5)_3$ (51.3 ml, the corresponding concentration was about 0.04 mole), prepared in accordance with Example 1. The light brown solution turned a dark brown; a light color precipitate formed. The slurry was then warmed to room temperature. The solid catalyst—the precipitate—was washed three times with heptane (120 mls per wash) and recovered.

EXAMPLE 3

A catalyst composition of $ZrCl_4$, $ZnCl_2 \cdot 2Al(C_2H_5)_3$ and $VO(OC_4H_9)_3$ was prepared. The molar ratio of these catalyst components, in the order listed, was about 1:4:1.

Into a three-neck round bottom flask fitted with a paddle stirrer and purged with $N_2$ was placed $ZrCl_4$ (3.92 grams, the corresponding concentration was about 0.0168 mole) and heptane (30 mls). A peach color slurry formed. To the slurry was added $C_4H_9OH$ (3.11 ml, the corresponding concentration was about 0.0336 mole), slowly, in a dropwise fashion, at room temperature (20°–25° C.). The peach color slurry turned white. The solution became clear 15 minutes later. Some peach color precipitate was observed and acid was detected in the $N_2$ purge gas effluent.

The three-neck flask was heated to 85° C. and stirred for 30 minutes, after which time an oily brown liquid layer was observed at the bottom; the solid precipitate had disappeared. $ZnCl_2 \cdot 2Al(C_2H_5)_3$, prepared in accordance with Example 1, was slowly added (86.2 ml, the corresponding concentration was about 0.0672 mole). A brown slurry was formed. The slurry was stirred, at room temperature, for 30 minutes. $VO(OC_4H_9)_3$ was added (16.8 ml, the corresponding concentration was 0.0168 mole) slowly, in dropwise fashion. A dark brown precipitate was formed, and the liquid layer had a light brown color. The slurry was stirred, at room temperature, for 30 minutes. The solid precipitate was then washed three times with heptane (120 mls per wash) to recover the solid catalyst).

EXAMPLE 4

A catalyst composition of $ZrCl_4$, $ZnCl_2 \cdot 2Al(C_2H_5)_3$, $VO(OC_4H_9)_3$ was prepared. The molar ratio of these catalyst components, in the order listed, was about 1:8:3.

Into a three-neck round bottom flask fitted with a paddle stirrer and purged with a $N_2$ was placed $ZrCl_4$ (2.13 grams; the corresponding concentration was about 0.00914 mole) and heptane (50 mls). $C_4H_9OH$ was added (1.69 mls; the corresponding concentration was about 0.01828 mole). The resulting solution was heated to 90° C. with stirring for 30 minutes, at the end of which time the top layer of the solution was observed to be clear; the bottom layer was observed as having a dark yellow color. The solution was then cooled to room temperature.

$ZnCl_2 \cdot 2Al(C_2H_5)_3$, prepared in accordance with Example 1, was slowly added to the solution (9.37 mls; the corresponding concentration was about 0.7312 mole). The solution was observed to turn milky and then dark brown. The solution was stirred at room temperature for 30 minutes, then chilled to 0° C. $VO(OC_4H_9)_3$ was added in dropwise fashion and a brown slurry was formed. The slurry was warmed to room temperature and stirred for 1 hour. The solid precipitate from the slurry was washed four times with heptane (125 mls per wash) to recover the solid catalyst.

EXAMPLE 5

A catalyst composition of $ZrCl_4$, $ZnCl_2 \cdot 2Al(C_2H_5)_3$, $VO(OC_4H_9)_3$ was prepared. The molar ratio of these catalyst components, in the order listed, was about 1:12:5.

Into a three-neck round bottom flask fitted with a paddle stirrer and purged with $N_2$, was placed $ZrCl_4$ (1.38 grams; the corresponding concentration was about 0.005918 mole) and heptane (50 mls). $C_4H_9OH$ was added (1.10 mls; the corresponding concentration was about 0.011836 mole) and the solution was heated with stirring at 90° C. for 1 hour. At the end of this time, the top layer of the solution observed to be clear, and the bottom layer a dark yellow color. The solution was cooled to room temperature and $ZnCl_2 \cdot 2Al(C_2H_5)_3$, prepared in accordance with Example 1, was added (91.0 mls; the corresponding concentration was about 0.071 mole). The solution was observed to turn milky with the first 6 mls; it then turned yellow and clear brown, then dark brown upon completion of the addition of the zinc complex. A light brown precipitate had formed. The solution was stirred at room temperature, then chilled to 0° C. with an ice bath. $VO(OC_4H_9)_3$ was added (29.6 mls; the corresponding concentration was about 0.02959 mole) in dropwise fashion over a period of 10 minutes. The solution was then stirred for 1 hour. The resultant catalyst was washed four times with heptane (125 mls per wash) and recovered.

EXAMPLE 6

A catalyst composition of $Zr(OC_4H_9)_4 \cdot nC_4H_9OH$, $VOCl_3$, $ZnCl_2 \cdot 2Al(C_2H_5)_3$ was prepared. The molar ratio of these catalyst components, in the order listed, was about 1:2:6. In this preparation, $Zr(OC_4H_9)_4$ was prereacted with $VOCl_3$ overnight before the activation treatment.

Into a Fisher-Porter bottle at room temperature was placed 3.48 mls of $Zr(OC_4H_9)_4 \cdot nC_4H_9OH$ (commercially obtained from Dynamite-Nobel Chemical; n was calculated to be about 1.3, the corresponding concentration was about 0.008 mole) and $VOCl_3$ (16 mls, the corresponding concentration was about 0.016 mole). The solution was stirred for 30 minutes, after which time a clear yellow solution with no precipitate was observed. The solution was allowed to stand overnight (approximately 15 hours) at room temperature, after which time the solution was observed to be clear and, brown in color; no precipitate was seen.

To this solution, $ZnCl_2 \cdot 2Al(C_2H_5)_3$, prepared in accordance with Example 1, as slowly added (61.5 mls, the corresponding concentration was about 0.048 mole). The addition was at room temperature and upon completion, a greenish brown precipitate in a brown solution was observed. The precipitate was washed three times with heptane (150 mls per wash) and the solid, greenish-brown catalyst was recovered.

EXAMPLE 7

A catalyst composition of $Zr(OC_4H_9)_4 \cdot nC_4H_5OH$, $ZnCl_2 \cdot 2Al(C_2H_5)_3$, and $VOCl_3$ was prepared. The molar ratio of these catalyst components, in the order listed, was about 1:6:2. In this catalyst preparation, the zirconium composition was not pre-reacted with the vanadium composition.

Into a Fisher-Porter bottle was placed 3.5 mls of $Zr(OC_4H_9)_4 \cdot nC_4H_5OH$ (commercially obtained from Dynamite-Nobel Chemical; n was calculated to be about 1.3 mole, and heptane (50 mls). To this solution was added, at room temperature (20°–25° C.) $ZnCl_2 \cdot 2Al(C_2H_5)_3$, (61.5 mls, the corresponding concentration was about 0.048 mole), prepared in accordance with Example 1. The addition, with stirring, was fast and resulted in a clouded solution that was observed to be yellow, then brown, and finally formed a brown solution with brown precipitate.

After 30 minutes at room temperature had passed, $VOCl_3$ (16 mls, the corresponding concentration was about 0.016 mole) was slowly added with fast stirring. Smoke was generated in the first 10 minutes. After 1 hour at room temperature a yellow-brown slurry was observed. After a first heptane wash (150 mls), the filtrate was observed to react with air to form a white precipitate. After a second heptane wash (150 mls) the filtrate was observed to still be reactive with air. After a third and fourth heptane wash (150 mls per wash), a yellowish-brown solid catalyst was recovered.

EXAMPLE 8

A catalyst composition of $ZrCl_4$, $ZnCl_2 \cdot 2Al(C_2H_5)_3$ and $VOCl_3$ was prepared. The molar ratio of these catalyst components, in the order listed was about 1:6:2.

Into a Fisher-Porter bottle was placed $ZrCl_4$ (1.75 grams, the corresponding concentration was about 0.0075 mole) and heptane (50 mls). While at room temperature, $C_4H_9OH$ was slowly added (1.29 mls, the corresponding concentration was about 0.015 mole). No observable reaction occurred at room temperature. The solution was heated at 90° C. for 1 hour, after which time the $ZrCl_4$ was observed to have disappeared, the resultant solution was a clear and yellow color, and had two layers.

The solution was cooled to room temperature with slow stirring and $ZnCl_2 \cdot 2Al(C_2H_5)_3$ prepared in accordance with Example 1, was slowly added (57.7 mls, the corresponding concentration was about 0.045 mole) while the solution was slowly stirred. The solution color was observed to turn brown in approximately 3 minutes and a brown precipitate was observed. After 30 minutes at room temperature, $VOCl_3$ (15 mls, the corresponding concentration was about 0.015 mole) was slowly added. White smoke was generated and the solution was stirred at room temperature for 1 hour. A brown slurry was observed. The solid was washed three times with heptane (150 mls per wash) and a brown color solid catalyst was recovered.

EXAMPLE 9

A catalyst composition of $Zr(OC_3H_7)_4$, $ZnCl_2 \cdot 2Al(C_2H_5)_3$, and $VOCl_3$ was prepared. The molar ratio of the catalyst components, in the order listed, was about 1:6:2.

$Zr(OC_3H_7)_4 \cdot nC_3H_7OH$ was commercially obtained from Alfa Chemical, n was calculated to be about 1.58. Into a Fisher-Porter bottle was placed the $Zr(OC_3H_7)_4 \cdot nC_3H_7OH$ (3.22 mls, the corresponding concentration was about 0.008 mole) and heptane (50 mls). Fast addition of $ZnCl_2 \cdot 2Al(C_2H_5)_3$, prepared in accordance with Example 1, followed (61.5 mls, the corresponding concentration was about 0.048 mole). The fast addition occurred at room temperature and was followed by slow stirring for 15 minutes. A brown solution with a brown precipitate was observed.

$VOCl_3$ was slowly added (16 mls, the corresponding concentration was about 0.016 mole) to this solution, at room temperature, and a solution with a brown precipitate was observed. After three washings with heptane (150 mls per wash), a solid brown catalyst was recovered.

EXAMPLE 10

A catalyst composition of $ZrCl_4$, $C_4H_5OH$, $ZnCl_2 \cdot 2Al(C_2H_5)_3$ and $VOCl_3$ was prepared. The molar ratio of the catalyst components in the order listed was about 1:2:8:3.

Into a 500 ml, 3-neck round bottom flask was added 1.47 g of $ZrCl_4$ and 50 mls heptane. With stirring, 1.17 mls of $C_4H_5OH$ was added (the $C_4H_5OH:Zr$ mole ratio was 2). The mixture was stirred at 90° C. until a clear light yellow solution formed. The solution was cooled to room temperature.

Next, 64.6 mls of $ZnCl_2 \cdot 2Al(C_2H_5)_3$, prepared in accordance with Example 1, was added dropwise at room temperature. The mixture was then stirred at room temperature for 30 minutes, during which time a precipitate formed. To this mixture, 18.9 mls of a 1.0 mM/ml solution of $VOCl_3$ in heptane was added. This mixture was stirred for about 30 minutes, then filtered, then washed three times with heptane (150 mls per wash). The final catalyst solid was brown.

EXAMPLE 11

Polymerization

Homopolymers of ethylene were prepared using the catalyst of the present invention. Polymerization was conducted in an autoclave of approximately 1.3 liters in size, and fitted with a stirrer. In each of the polymerizations the reactor was purged with $N_2$ at a temperature greater than about 100° C. for about two hours. A solution of co-catalyst in heptane (about 0.5 mls of triethyl aluminum as a 25 weight percent solution thereof in heptane) was added to the reactor at the desired reaction temperature (about 80°–100° C.). The reactor was then closed and $H_2$ was added to the reactor from a pressure vessel. Isobutane was added (about 500 mls) and the stirrer in the reactor was turned on. Ethylene was then added to the reactor up to the desired operating pressure (about 550 psi). Modifier was then injected at the polymerization temperature, followed by the catalyst of the instant invention about one minute later. Polymerization was run for about one hour. The reaction was terminated by shutting off the ethylene supply and venting the reactor.

Table 1, below, identifies reaction conditions (temperature, ethylene, hydrogen, modifier), catalyst reactivity (in grams of polyethylene produced per gram of catalyst per hour, gPE/gCAT-hr) and MI, HLMI and MIR of the polymer produced for each run using the catalyst prepared according to Examples 3, 4, 5, 6, 7, 9 and 10.

TABLE 1

| | | POLYMERIZATION DATA | | | | | | | |
|---|---|---|---|---|---|---|---|---|---|
| Run | T (°C.) | C2H4 Mole % | K2 (psi) | Modifier Type | Modifier Micromoles | Reactivity g PK/gCat-hr | MI | HLMI | MIR |
| | | CATALYST OF EXAMPLE 3 | | | | | | | |
| 1 | 80.0 | 10.0 | 300 | CHCl3 | 500 | 6240 | 0.02 | 1.7 | 84 |
| 2 | 80.0 | 10.0 | 300 | CHCl3 | 2000 | 5330 | 0.02 | 2.4 | 105 |
| 3 | 80.0 | 10.0 | 400 | CFCl3 | 500 | 6705 | 0.05 | 4.5 | 85 |

TABLE 1-continued

| | | | | POLYMERIZATION DATA | | | | | |
|---|---|---|---|---|---|---|---|---|---|
| Run | T (°C.) | C2H4 Mole % | K2 (psi) | Modifier Type | Modifier Micromoles | Reactivity g PK/gCat-hr | MI | HLMI | MIR |
| | | | | CATALYST OF EXAMPLE 4 | | | | | |
| 4 | 80.0 | 10.0 | 200 | CHCl3 | 200 | 4806 | 0.11 | 38.8 | 363 |
| 5 | 80.0 | 10.0 | 200 | CHCl3 | 500 | 5712 | 0.64 | 168.3 | 265 |
| 6 | 80.0 | 10.0 | 200 | CHCl3 | 1000 | 4604 | 0.26 | 78.9 | 307 |
| 7 | 93.3 | 8.5 | 200 | CHCl3 | 500 | 8058 | 0.11 | 38.4 | 356 |
| 8 | 80.0 | 10.0 | 200 | CFCl3 | 500 | 4647 | 0.57 | 167.8 | 296 |
| 9 | 80.0 | 10.0 | 200 | Cl2FCCClF2 | 500 | 3856 | — | 0.2 | — |
| | | | | CATALYST OF EXAMPLE 5 | | | | | |
| 10 | 80.0 | 10.0 | 200 | CHCl3 | 500 | 8040 | 1.66 | 239.9 | 145 |
| 11 | 93.3 | 5.0 | 75 | CHCl3 | 500 | 5940 | 1.29 | 168.4 | 132 |
| 12 | 93.3 | 6.0 | 75 | CHCl3 | 1000 | 10400 | 0.82 | 102.5 | 125 |
| 13 | 93.3 | 6.0 | 75 | CFCl3 | 500 | 8930 | 0.56 | 72.6 | 130 |
| 14 | 93.3 | 6.0 | 75 | CFCl3 | 100 | 14450 | 0.44 | 57.9 | 132 |
| 15 | 80.0 | 10.0 | 150 | CFCl3 | 100 | 11970 | 4.40 | — | — |
| 16 | 93.3 | 6.0 | 75 | Cl2FCCClF2 | 500 | 3300 | — | 3.3 | — |
| 17 | 93.3 | 6.0 | 75 | (CH3)3SiCl | 500 | 1250 | — | 0.1 | — |
| | | | | CATALYST OF EXAMPLE 6 | | | | | |
| 18 | 93.3 | 7.0 | 100 | CFCl3 | 100 | 12186 | 0.07 | 16.2 | 225 |
| 19 | 93.3 | 7.0 | 100 | CFCl3 | 200 | 10940 | 0.04 | 9.6 | 229 |
| 20 | 93.3 | 7.0 | 100 | CFCl3 | 400 | 10245 | 0.04 | 9.8 | 251 |
| 21 | 93.3 | 7.0 | 150 | CHCl3 | 200 | 10380 | 0.18 | 46.6 | 266 |
| 22 | 93.3 | 7.0 | 100 | CHCl3 | 200 | 11880 | 0.04 | 9.6 | 234 |
| 23 | 93.3 | 7.0 | 100 | CHCl3 | 400 | 1333 | 0.07 | 11.5 | 155 |
| 24 | 93.3 | 7.0 | 100 | CHCl3 | 200 | 7287 | 0.03 | 10.0 | 303 |
| 25 | 93.3 | 7.0 | 100 | CHCl3 | 200 | 9100 | 0.11 | 21.9 | 205 |
| 26 | 93.3 | 7.0 | 100 | CH2BrCl | 100 | 53330 | 0.05 | 9.7 | 206 |
| 27 | 93.3 | 7.0 | 100 | CBr2F2 | 100 | 6713 | 0.08 | 22.3 | 297 |
| | | | | CATALYST OF EXAMPLE 7 | | | | | |
| 28 | 93.3 | 7.0 | 100 | CFCl3 | 100 | 15200 | — | 1.3 | — |
| 29 | 93.3 | 7.0 | 125 | CFCl3 | 400 | 21840 | — | 4.5 | — |
| 30 | 93.3 | 7.0 | 150 | CFCl3 | 100 | 13642 | — | 2.5 | — |
| 31 | 93.3 | 7.0 | 150 | CFCl3 | 400 | 13033 | 0.01 | 4.1 | 293 |
| 32 | 93.3 | 7.0 | 150 | CFCl3 | 400 | 14050 | — | 3.1 | — |
| 33 | 93.3 | 7.0 | 200 | CFCl3 | 400 | 17010 | 0.03 | 8.6 | 345 |
| 34 | 93.3 | 7.0 | 175 | CFCl3 | 800 | 12667 | 0.03 | 6.3 | 216 |
| 35 | 93.3 | 7.0 | 200 | CHCl3 | 400 | 17125 | 0.02 | 6.5 | 260 |
| 36 | 93.3 | 7.0 | 200 | CHCl3 | 100 | 12558 | 0.01 | 3.0 | 374 |
| 37 | 93.3 | 7.0 | 175 | CHCl3 | 800 | 16500 | 0.03 | 7.8 | 312 |
| | | | | CATALYST OF EXAMPLE 9 | | | | | |
| 38 | 93.3 | 7.0 | 100 | CHCl3 | 100 | 8461 | 0.02 | 3.5 | 233 |
| 39 | 93.3 | 7.0 | 100 | CHCl3 | 400 | 5400 | 0.09 | 20.7 | 229 |
| 40 | 93.3 | 7.0 | 100 | CFCl3 | 100 | 8873 | 0.04 | 5.9 | 169 |
| 41 | 93.3 | 7.0 | 100 | CFCl3 | 400 | 6613 | 0.21 | 34.5 | 167 |
| 42 | 93.3 | 7.0 | 100 | CFCl3 | 400 | 7027 | 0.33 | 49.1 | 149 |
| 43 | 99.0 | 7.0 | 70 | CFCl3 | 400 | 5333 | 0.15 | 23.8 | 162 |
| 44 | 99.0 | 7.0 | 70 | CFCl3 | 400 | 10927 | 0.02 | 3.8 | 222 |
| | | | | CATALYST OF EXAMPLE 10 | | | | | |
| 45 | 93.3 | 7.0 | 100 | CFCl3 | 100 | 15870 | — | 2.0 | — |
| 46 | 93.3 | 7.0 | 200 | CFCl3 | 100 | 8430 | 0.02 | 3.6 | 223 |
| 47 | 93.3 | 7.0 | 200 | CFCl3 | 400 | 14560 | 0.05 | 16.3 | 347 |
| 48 | 93.3 | 7.0 | 200 | CFCl3 | 400 | 9790 | 0.12 | 48 | 400 |
| 49 | 93.3 | 7.0 | 200 | CHCl3 | 400 | 12610 | 0.04 | 9.8 | 223 |
| 50 | 93.3 | 7.0 | 200 | CHCl3 | 800 | 13410 | 0.44 | 11.1 | 252 |

As seen from Table 1 above, the catalyst of Example 3 exhibited high reactivity with both CHCl3 and CFCl3 modifiers. Similarly, the catalyst of Example 4, which had a vanadium to zirconium ratio of 3, exhibited high reactivity which CHCl3, CFCl3 and Cl2FCCClF2 as modifiers. Run number 7 in this regard showed particularly high catalyst reactivity at the higher reaction temperature (about 93.3° C.).

The catalyst of Example 5, having a vanadium to zirconium ratio of 5, exhibited high reactivity with CHCl3, CFCl3, Cl2FCCClF2 and (CH3)3SiCl as modifiers. Table 1 further shows that this catalyst was very reactive even at reduced levels of ethylene, i.e., at 5 and 6 mole %, as shown by Run numbers 11, 12, 13, 14, 16 and 17. A comparison of Run number 10 using the catalyst of Example 5 with Run number 5 using the catalyst of Example 4, wherein all other relevant conditions were substantially the same, shows that the former had higher MI, greater reactivity and a narrower MWD as measured by MIR. Run numbers 10–17 further indicate that, at least for the catalyst of Example 5, the use of CHl3 and CFCl3 as modifiers gave higher MI potential than the use of Cl2FCCClF2 and (CH3)3SiCl.

Run numbers 18–27 in Table 1 utilized catalyst prepared in accordance with Example 6 wherein the zirconium and vanadium compounds were pre-complexed prior to reaction with the activator compound; the vanadium to zirconium ratio was 2. Table 1 shows that this catalyst was very reactive when used in conjunction with CHCl3, CFCl3, CH2BrCl and CBr2F2 as modifiers. The catalyst also produced a broad MWD as measured by MIR. Run numbers 24 and 25 employed trihexyl aluminum and triethyl aluminum, respectively, as cocatalysts; all other runs using the catalyst of Example 6 employed tri-isobutylaluminum as cocatalyst. Generally, the use of triethylaluminum gave higher MI.

Run numbers 28–37 show polymerization data using catalyst prepared pursuant to Example 7. This catalyst had the same vanadium to zirconium ratio as the catalyst from Example 6; however, the zirconium and vanadium compounds were not pre-complexed. The catalyst of Example 7 showed high reactivity with CHCl$_3$ and CFCl$_3$ as modifiers. A comparison of Run numbers 18–27 using catalyst of Example 6 to Run numbers 28–37 using catalyst of Example 7 shows that the former required less hydrogen to yield similar MI. The polymer obtained using the catalyst of Example 7 manifested broad MWD as evidenced by the high MIR. In addition, the molecular weight of the polymer was high, as gauged by the HLMI being low, e.g., lower than about 60.

Run numbers 38–44 of Table 1 illustrate polymerization using catalyst prepared in accordance with Example 9 wherein the vanadium compound was VOCl$_3$, the zirconium compound was Zr(OC$_3$H$_7$)$_4$ . nC$_3$H$_7$OH and the vanadium to zirconium ratio was 2. The catalyst exhibited high reactivity with both CHCl$_3$ and CFCl$_3$ as modifiers. A comparison of Run numbers 38 and 40 with Run numbers 39 and 41, respectively, shows that when the concentration of modifier was increased, the MI potential increased.

Run numbers 45–50 of Table 1 illustrate polymerization using catalyst prepared in accordance with Example 10. The catalyst showed very high activity and the polymer thus obtained manifested broad MWD as evidenced by the high MIR. In addition, the molecular weight of the polymer was high, as gauged by the HLMI being low, e.g., lower than about 60.

The Figure shows the molecular weight distribution curve for the polymer obtained from Run 15, using catalyst prepared in accordance with Example 5. As seen by reference to the Figure, the polymer obtained by using the catalyst of the present invention manifests a bimodal profile. The curve of the Figure was specifically obtained on the basis of gel permeation chromatography (GPC).

The polymers of this invention have many and varied uses, including formation into films, injection-molded articles and blow-molded articles using well-known forming methods. The polymers are contemplated to be especially useful for forming high-strength films (i.e., films having high impact strength and/or high tear resistance) and injection-molded and blow-molded articles having high ESCR (i.e., environmental stress-crack resistance).

The term HLMI, as used herein means the high load melt index as measured at 190° C. and 21.6 kg in accordance with ASTM D1238-82.

What is claimed is:

1. A catalyst consisting essentially of the product obtained by admixing:
   (a) a zirconium composition having the formula ZrX$_a^1$(OR$^1$)$_{4-a}$ wherein X$^1$ is halogen, R$^1$ is hydrocarbyl having 1 to about 18 carbon atoms and a is 0 or an integer from 1 to 4 and mixtures thereof;
   (b) a vanadium composition selected from the group consisting of compounds having the formula VX$_c^2$(OR$^2$)$_{b-c}$ wherein X$^2$ is halogen, R$^2$ is hydrocarbyl having 1 to about 18 carbon atoms b is the valence of vanadium and is 3 or 4 and c is 0 or an integer from 1 to b, VOX$_d^3$(OR$^3$)$_{3-d}$ wherein X$^3$ is halogen, R$^3$ is hydrocarbyl having 1 to about 18 carbon atoms and d is 0 or an integer from 1 to 3, VOX$_2^4$ wherein X$^4$ is halogen, and mixtures thereof; and
   (c) an activator selected from the group consisting of compounds having the formula ZnX$_2^5$ . 2AlR$_3^4$ wherein X$^5$ is halogen, R$^4$ is hydrocarbyl having 1 to about 12 carbon atoms, Al$_2$R$_3^6$X$^7$ wherein R$^6$ is hydrocarbyl having 1 to about 12 carbon atoms and X$^7$ is halogen, MgR$_f^7$Y$_{2-f}$ wherein R$^7$ is hydrocarbyl having 1 to about 12 carbon atoms, Y has the formula OR$^8$ wherein R$^8$ is hydrocarbyl having 1 to 12 carbon atoms or Y is a silyl amide having the formula N(SiR$_3^9$)$_2$ wherein R$^9$ is hydrocarbyl having 1 to about 12 carbon atoms and f is 0, 1 or 2, and mixtures thereof.

2. The catalyst of claim 1 wherein R$^1$, R$^2$, R$^3$, R$^4$, R$^6$, R$^7$, R$^8$ and R$^9$ are each independently alkyl, cycloalkyl, aryl, aralkyl, alkaryl or mixtures thereof.

3. The catalyst of claim 2 wherein R$^1$, R$^2$, R$^3$, R$^4$, R$^6$, R$^7$, R$^8$ and R$^9$ are each independently alkyl having 2 to about 10 carbon atoms.

4. The catalyst of claim 1 wherein X$^1$, X$^2$, X$^3$, X$^4$, X$^5$, X$^7$ and Y are each chlorine.

5. The catalyst of claim 1 wherein said activator is ZnCl$_2$ . 2Al(C$_2$H$_5$)$_3$, (C$_2$H$_5$)$_3$Al$_2$Cl$_3$, (C$_4$H$_9$)$_2$Mg, C$_4$H$_9$MgC$_2$H$_5$, C$_4$H$_9$MgN(Si(CH$_3$)$_3$)$_2$ or mixtures thereof.

6. The catalyst of claim 1 wherein said zirconium compound is ZrCl$_4$, ZrCl$_2$(OC$_4$H$_9$)$_2$, Zr(OC$_3$H$_7$)$_4$, Zr(OC$_4$H$_9$)$_4$ or mixtures thereof.

7. The catalyst of claim 1 wherein said vanadium compound is VOCl$_3$, VO(OC$_4$H$_9$)$_3$, VCl$_4$, VO(i-OC$_3$H$_7$)$_3$, VOCl$_2$ or mixtures thereof.

8. The catalyst of claim 1 wherein for each mole of zirconium composition, up to about 10 moles of vanadium composition and up to about 25 moles of activator are admixed.

9. The catalyst of claim 8 wherein for each mole of zirconium composition, up to about 8 moles of vanadium composition and up to about 17 moles of activator are admixed.

10. The catalyst of claim 9 wherein for each mole of zirconium composition, up to about 5 moles of vanadium composition and up to about 12 moles of activator are admixed.

11. The catalyst of claim 10 wherein for each mole of zirconium composition, up to about 3 moles of vanadium composition and up to about 8 moles of activator are admixed.

12. The catalyst of claim 11 wherein for each mole of zirconium composition, up to about 1 mole of vanadium composition and up to about 4 moles of activator are admixed.

13. An olefin polymerization catalyst system comprising the catalyst of claim 1 and a co-catalyst of a metal alkyl, metal alkyl hydride, metal alkyl halide or metal alkyl alkoxide, wherein said metal is aluminum, boron, zinc or magnesium.

14. The olefin polymerization catalyst system of claim 13, wherein the alkyl has 1 to about 12 carbon atoms.

15. The olefin polymerization catalyst system of claim 13 wherein the co-catalyst is triethyl aluminum or tri-isobutyl aluminum.

16. The olefin polymerization catalyst system of claim 13 further comprising a modifier having the formula

wherein M$^1$ is Si, C, Ge or Sn, X$^8$ is halogen, g is 0, 1, 2 or 3 and h has the valence of M$^1$.

17. The olefin polymerization catalyst system of claim 16 wherein said modifier is CCl$_4$, CH$_2$Cl$_2$, CBr$_4$, CH$_3$CCl$_3$, CF$_2$ClCCl$_3$, CHCl$_3$, CFCl$_3$, CFCl$_2$CCF$_2$Cl, (CH$_3$)$_3$SiCl or mixtures thereof.

* * * * *